US010123237B2

(12) United States Patent
Narasimha et al.

(10) Patent No.: US 10,123,237 B2
(45) Date of Patent: *Nov. 6, 2018

(54) METHOD AND APPARATUS FOR HANDOVER IN A WIRELESS COMMUNICATION SYSTEM

(71) Applicant: Google Technology Holdings LLC, Mountain View, CA (US)

(72) Inventors: Murali Narasimha, Lake Zurich, IL (US); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/192,001

(22) Filed: Jun. 24, 2016

(65) Prior Publication Data

US 2016/0309370 A1   Oct. 20, 2016

Related U.S. Application Data

(63) Continuation of application No. 11/742,134, filed on Apr. 30, 2007, now Pat. No. 9,380,503.

(51) Int. Cl.
*H04W 4/00* (2018.01)
*H04W 36/00* (2009.01)
(Continued)

(52) U.S. Cl.
CPC ... *H04W 36/0016* (2013.01); *H04W 36/0072* (2013.01); *H04W 36/0077* (2013.01);
(Continued)

(58) Field of Classification Search
CPC ......... H04W 36/0016; H04W 36/0072; H04W 36/0077; H04W 56/001; H04W 74/0833
See application file for complete search history.

(56) References Cited

U.S. PATENT DOCUMENTS

2005/0250499 A1   11/2005   Lee et al.
2007/0047493 A1   3/2007   Park et al.
(Continued)

FOREIGN PATENT DOCUMENTS

EP   1045607 A2   10/2000
EP   1959708 A1   8/2008
(Continued)

OTHER PUBLICATIONS

Early RACH Access with Reserved Signatures for inter-eNB Handover; 3GPP TSG_RAN WG2 Meeting; Mar. 6-30, 2007.
(Continued)

*Primary Examiner* — Wayne H Cai
(74) *Attorney, Agent, or Firm* — Faegre Baker Daniels LLP

(57) ABSTRACT

A method and apparatus for handover in a wireless communication system. A handover indication can be received from a source base station (120) that is connected with a mobile station (110). The handover indication can include a random access channel preamble. The random access channel preamble can include a temporary mobile equipment identifier. The random access channel preamble can be received from the mobile station. A timing advance message can be sent in response to receiving random access channel preamble. The timing advance message can be addressed by the random access channel preamble and a source base station identifier. The connection with the mobile station can be switched from the source base station to a target base station (130).

14 Claims, 6 Drawing Sheets

(51) Int. Cl.
*H04W 56/00* (2009.01)
*H04W 74/08* (2009.01)

(52) U.S. Cl.
CPC ..... *H04W 56/001* (2013.01); *H04W 74/0833* (2013.01); *H04W 56/00* (2013.01)

(56) References Cited

U.S. PATENT DOCUMENTS

| | | | |
|---|---|---|---|
| 2007/0291729 A1 | 12/2007 | Dalsgaard et al. | |
| 2008/0182579 A1 | 7/2008 | Wang et al. | |
| 2008/0233963 A1 | 9/2008 | Alanara et al. | |
| 2008/0267127 A1 | 10/2008 | Narasimha et al. | |
| 2008/0267131 A1 | 10/2008 | Kangude et al. | |
| 2009/0017825 A1* | 1/2009 | Guillouard | H04W 48/08 455/440 |

FOREIGN PATENT DOCUMENTS

| | | |
|---|---|---|
| WO | 2008024788 A2 | 2/2008 |
| WO | 2008038093 A2 | 4/2008 |

OTHER PUBLICATIONS

3GPP Organizational Partners, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V1.0_0 (Mar. 2007), Sections 10.1.2 to 10.1.5, pp. 41-47.

Nokia, "Non contention based HO", 3GPP TSG-RAN WG2 Meeting #57, St. Louis, USA Feb. 12-16, 2007, R2-070455, pp. 1-6.

Samsung, "Evaluation of backward handover schemes", 3GPP TSG-RAN2 Meeting #57, St. Louis, USA Feb. 12-16, 2007, Tdoc R2-070676, pp. 1-12.

Motorola, "Interruption time during Handover and total handover duration", 3GPP TSG-RAN WG2 #58, May 7-11, 2007, Kobe, Japan, R2-072003, pp. 1-5.

Motorola, "RACH Preamble Reservation for Handover", 3GPP TSG-RAN WG2 #58, May 7-11, 2007, Kobe, Japan, R2-072004, pp. 1-4.

Motorola, "Interruption time during Handover and total handover duration", 3GPP TSG-RAN WG2 #58-bis, Jun. 25-29, 2007, Orlando, FL USA, R2-072791, pp. 1-6.

Motorola, "On the need for a separate procedure for Synchronized Handover", 3GPP TSG-RAN WG2 #59, Aug. 20-24, 2007, Athens, Greece, R2-073536, pp. 1-5.

World Intellectual Property Office, International Preliminary Report on Patentability in connection with counterpart International Application No. PCT/US2008/061291, Nov. 12, 2009, 10 pages.

Nokia: "Non Contention Based Handover" Ericsson, TSG-RAN WG2 Meeting #56BIS, Sorento Italy, vol. R2-070011, Jan. 15, 2007 (Jan. 15, 2007), pp. 1-4 XP003023806.

Fujitsu: "Random Access for Less-Contention-Based Handover" 3GPP TSG-RAN-WG1 Meeting #46BIS, 3GPP TSG-RAN-WG2 Meeting #55, Seoul, Korea, vol. R1-062893, R1-062886, Oct. 9, 2006 (Oct. 9, 2006), pp. 1-9 XP003022788.

Ericsson: "On the Details of the Dedicated Preamble at Intra-LTE Handover" 3GPP TSG-RAN WG2 #59, Athens, Greece, vol. R2-073238 Aug. 20, 2007 (Aug. 20, 2007), pp. 1-3 XP003023805.

* cited by examiner

METHOD AND APPARATUS FOR HANDOVER IN A WIRELESS COMMUNICATION SYSTEM

CROSS-REFERENCE TO RELATED APPLICATIONS

This application is a continuation of U.S. patent application Ser. No. 11/742,134, filed Apr. 30, 2007, having inventors Muralia Narasimha et al., entitled "Method and Apparatus for Handover in a Wireless Communication System" which is related to the application entitled "Method and Apparatus for Handover in a Wireless Communication System," Motorola case number CS33279 and the application entitled "Method and Apparatus for Handover in a Wireless Communication System," Motorola case number CS33396, filed on even date herewith and commonly assigned to the assignee of the present application, which is hereby incorporated by reference.

BACKGROUND

Field

The present disclosure is directed to a method and apparatus for handover in a wireless communication system. More particularly, the present disclosure is directed to handover of a mobile station from a source base station to a target base station.

Description of Related Art

Presently, wireless network systems can use multiple base stations to provide coverage for mobile stations, such as cellular phones. When traveling in a wireless network system, the mobile station can be handed off from one base station to another depending on which one is best suited for the mobile station. For example, when the mobile station is using a first base station and then moves closer to a second base station, the first base station can hand the mobile station over to the second base station if it determines the second base station will provide a better signal for the mobile station. Such a procedure can be used in current systems and Fourth Generation (4G) systems, such as the Third Generation Partnership Project Long Term Evolution (3GPP LTE) system.

Unfortunately, signaling in current networks result in call interruptions when the mobile station is handed over from one base station to another. For example, in current systems, the procedure to acquire uplink synchronization with the target base station requires the mobile station to interrupt its uplink and downlink data transfer through the source base station. Due to delays involved in re-routing un-transmitted packets for transmission via the target base station, such packets may be too late and may simply be discarded, especially for real-time services such as voice. Furthermore, the probability of success of a Random Access Channel (RACH) attempt can vary and, in cases where the mobile station is near a boundary of the source base station and the target base station, it is likely that the RACH procedure will take several attempts. With current interruption times of 10-20 ms the outage criterion is quickly reached and a mobile station that sees a 2% Frame-Error Rate (FER) is considered to be in outage.

Another problem exists for non-contention preambles that are used to avoid RACH transmission conflicts between different mobile stations by distinguishing between different mobile stations. Assigning a non-contention preamble is a very complex task at the target base station. Since the preamble is used on the RACH of the target base station, it has to be picked by the target base station, so that it can assign different preambles to different mobile stations that are attempting handover into the target base station. The target base station has to process handover requests from different source base stations in real-time, and reserve RACH preambles for each request. This reserved preamble has to be communicated to the respective source base stations which then assign them to the respective mobile stations. The time required to deliver the message containing the reserved RACH preamble to the mobile station can vary; thus the target base station has to reserve the RACH preamble for multiple RACH opportunities. The target base station also needs to maintain a timer associated with each assigned preamble and release the preamble into the available pool if the preamble is not used within a certain time limit. While this implementation is necessary to maintain the contention-free property, the likelihood of two or more mobile stations attempting to handover to a target base station at the same RACH opportunity is generally low. Thus, the gains of the contention-free scheme are not commensurate with the complexity of the procedure required to manage the contention-free scheme.

Thus, there is a need for handover procedures that eliminate or minimize the interruption time. There is also a need for handover procedures that are less complex and effectively contention-free.

SUMMARY

The present disclosure can provide a handover procedure that eliminates or minimizes the interruption time. The present disclosure can also provide a handover procedure that is less complex and effectively contention-free. A handover indication can be received from a source base station that is connected with a mobile station. The handover indication can include a random access channel preamble. The random access channel preamble can include a temporary mobile equipment identifier. The random access channel preamble can be received from the mobile station. A timing advance message can be sent in response to receiving random access channel preamble. The timing advance message can be addressed by the random access channel preamble and a source base station identifier. The connection with the mobile station can be switched from the source base station to a target base station.

BRIEF DESCRIPTION OF THE DRAWINGS

The embodiments of the present disclosure will be described with reference to the following figures, wherein like numerals designate like elements, and wherein.

DETAILED DESCRIPTION

Figure 1:
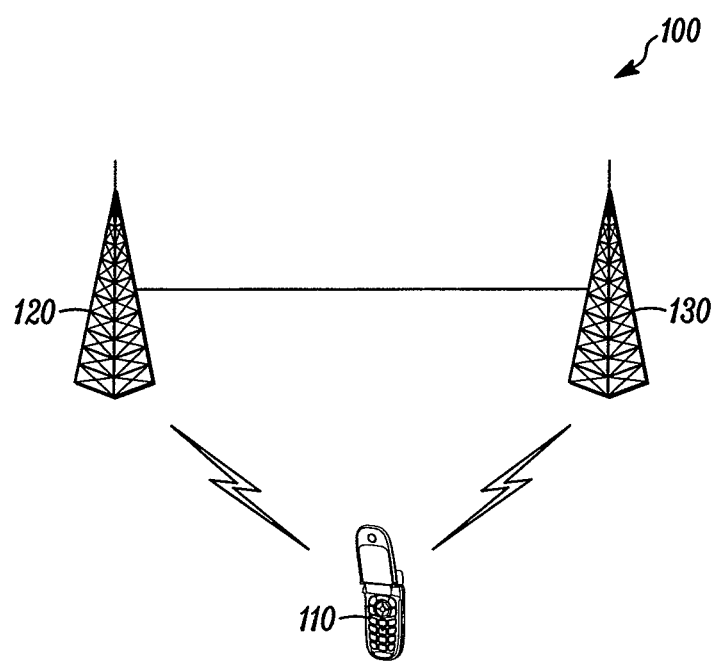
FIG. 1 is an exemplary diagram of a system according to one embodiment.

FIG. 1 is an exemplary diagram of a system 100 according to one embodiment. The system 100 can include a mobile station 110, a source base station 120, and a target base station 130. The mobile station 110 may be a wireless communication device, such as a wireless telephone, a cellular telephone, a personal digital assistant, a pager, a personal computer, a selective call receiver, or any other device that is capable of sending and receiving communication signals on a network including wireless network. The base stations 120 and 130 may be any combination of wireless base stations, cellular base stations, access points, or any other base station useful for sending and receiving wireless signals to and from a mobile station. The system 100 may include any type of network that is capable of sending and receiving signals, such as wireless signals. For example, the system 100 may include a wireless telecommunications network, a cellular telephone network, a Time Division Multiple Access (TDMA) network, a Code Division Multiple Access (CDMA) network, a satellite communications network, a wireless local area network, a Global System for Mobile (GSM) communications network, Orthogonal Frequency Division Multiplexed (OFDM) systems, and other wireless communication systems. Furthermore, the system 100 may include more than one network and may include a plurality of different types of networks. Thus, the system 100 may include a plurality of data networks, a plurality of telecommunications networks, a combination of data and telecommunications networks and other like communication systems capable of sending and receiving communication signals.

In operation, the source base station 120 can establish a connection with the mobile station 110. The source base station 120 can receive a measurement report from the mobile station 110. The source base station 120 can determine the mobile station 110 should perform a handover from the source base station 120 to the target base station 130. The source base station 120 can then generate a random access channel preamble in response to determining the mobile station 110 should perform a handover. The random access channel preamble can be a temporary mobile equipment identifier for the mobile station 110. The source base station 120 can send the random access channel preamble to the mobile station 110. The source base station 120 can then switch the connection with the mobile station 110 to the target base station 130.

The random access channel preamble can thus be used as a part of a procedure to initiate connection to a target base station during a handover. It can also be also used as a part of a procedure to initiate a connection when there is not one already present. Typically, it may be possible that two or more mobile stations can try to initiate connection to a base station at the same time. In such a situation, the colliding messages from these mobile stations could erase each other and the base station would not receive anything decipherable. This situation can lead to delays, excessive retransmission of the connection initiation and other problems. In order to prevent this situation of multiple mobiles trying to initiate a connection at the same time and erasing each others' transmissions, a random access channel preamble can be used. Typically, the random access channel preamble can be a short bit sequence randomly chosen by a mobile station and included in its connection initiation message. The base station can receive and distinguish multiple connection initiation messages because of the random access channel preamble. That is, although the base station does not know which mobiles are attempting a connection initiation, it can know that there are a certain number of mobiles attempting connection initiation. It may still be possible for different mobiles to pick the same random access channel preamble since it is picked randomly. Thus, the chosen random access channel preamble cannot necessarily be used to temporarily identify the mobile. According to the present disclosure, since we can ensure that different mobile stations do not get assigned the same random access channel preamble, we can use the random access channel preamble as a temporary identifier of a mobile station. We can perform the random access channel preamble assignment at the source base station rather than the target base station.

In further operation, the source base station 120 can send the random access channel preamble to the target base station 130. The source base station 120 can receive, from the target base station 130, after sending the random access channel preamble to the target base station 130, a timing advance message including timing advance information for the mobile station 130. The source base station 120 can then send the timing advance message to the mobile station 110. The source base station 120 can also receive, from the target base station 130, after sending the random access channel preamble to the target base station 130, a medium access control identifier for the mobile station 110 and a timing advance message including timing advance information for the mobile station 110. The source base station 120 can then send the medium access control identifier and the timing advance message to the mobile station 110.

The source base station 120 can send the random access channel preamble to the target base station 130 by sending, after determining the mobile station 110 should perform a handover, a handover request to the target base station 130, the handover request requesting handover of the mobile station 110 from the source base station 120 to the target base station 130, the handover request including the random access preamble.

The source base station 120 can also send a persistent resource assignment message to the mobile station 110, the persistent resource assignment message indicating resources reserved for handover communications. The source base station 120 can send the random access channel preamble to the mobile station 110 by sending a handover preparation message over a resource reserved for handover communications to the mobile station 110, the handover preparation message including the random access channel preamble.

The source base station 120 can generate the random access channel preamble at the source base station 120 by selecting the random access channel preamble from a set of a plurality of random access channel preambles reserved for handover. The set of a plurality of preambles can be shared between a plurality of base stations in adjacent cells and wherein a base station of the plurality of base stations selects a random access channel preamble based on a different starting random access channel preamble within the set of a plurality of preambles from at least one other base station of the plurality of base stations. The source base station 120 can select the random access channel preamble from a set of a plurality of random access channel preambles by selecting a first preamble in a sequence of a plurality of random access channel preambles in response to receiving a first measurement report and the subsequent preamble in the sequence in response to receiving a second measurement report.

According to a related embodiment, the mobile station 110 can establish a connection with a source base station 120. The mobile station 110 can send a measurement report to the source base station. The mobile station 110 can receive a persistent resource assignment message from the source base station 120. The persistent resource assignment message can indicate resources reserved for handover communications. The mobile station 110 can also receive a random access channel preamble from the source base station 120. The random access channel preamble can be a temporary mobile equipment identifier for the mobile station 110. The mobile station 110 can then switch the connection of the mobile station 110 with the source base station 120 to the target base station 130.

The mobile station 110 can receive the random access channel preamble by receiving a handover preparation message over a resource reserved for handover communications to the mobile station 110. The handover preparation message can include the random access channel preamble. The handover preparation message can be received after receiving the persistent resource assignment message.

The mobile station 110 can also receive, from the source base station 120, a timing advance message including timing advance information for the mobile station 110. The mobile station 110 can receive, from the source base station 120, a medium access control identifier for the mobile station 110 and a timing advance message including timing advance information for the mobile station 110.

According to another embodiment, the target base station 130 can receive a handover indication from the source base station 120 that is connected with the mobile station 110. The handover indication can include a random access channel preamble, the random access channel preamble comprising a temporary mobile equipment identifier for the mobile station 110. The target base station 130 can then receive the random access channel preamble from the mobile station 110. In response to receiving random access channel preamble, the target base station 130 can send a timing advance message. The timing advance message can be addressed by the random access channel preamble and a source base station identifier. The target base station 130 can then switch the connection with the mobile station 110 from the source base station 120 to the target base station 130.

The target base station 130 can calculate the timing advance for the mobile station for the timing advance message. The timing advance message can include at least one of the timing advance for the mobile station and an uplink grant for the mobile station. The timing advance can be calculated based on the propagation time of radio waves between the mobile station and the target base station.

The random access channel preamble can be based on selecting the random access channel preamble from a set of a plurality of random access channel preambles reserved for handover. The set of a plurality of preambles can be shared between a plurality of base stations in adjacent cells. A base station of the plurality of base stations can select a random access channel preamble based on a different starting random access channel preamble within the set from at least one other base station of the plurality of base stations.

The target base station 130 can receive a handover indication by receiving a handover indication from a source base station 120 that is connected with the mobile station 110. The handover indication can include a random access channel preamble associated with the mobile station 110. The handover indication can be received in response to the source base station 120 receiving a measurement report from the mobile station 110 and making a handover determination based on the measurement report.

According to a related embodiment, the mobile station 110 can establish a connection with the source base station 120. The mobile station 110 can send a measurement report to the source base station 120, the source base station 120 having a source base station identity. The mobile station 110 can receive a handover command including a random access channel preamble. The random access channel preamble can be a temporary mobile equipment identifier. The mobile station 110 can send the random access channel preamble to a target base station 130. The mobile station 110 can receive a timing advance message from the target base station 130. The timing advance message can be addressed by at least the random access channel preamble and a source base station identity. The mobile station 110 can then switch the connection from the source base station 120 to the target base station 130.

The timing advance message can include the timing advance for the mobile station 110 and a medium access control identifier. The timing advance message can include the timing advance for the mobile station 110, a medium access control identifier, and an uplink grant for the mobile station 110. The timing advance can be based on the propagation time of radio waves between the mobile station 110 and the target base station 130.

The handover command can include the random access channel preamble and an assignment of transmit and receive gaps for further communications regarding the random access channel preamble. The mobile station 110 can wait for a handover response directly from the target base station 130 after sending the random access channel preamble to the target base station 130 instead of waiting for a handover response from the source base station 120.

According to another embodiment, the source base station 120 can establish a connection with the mobile station 110. The source base station 120 can receive a measurement report at the source base station 120 from the mobile station 110. The source base station 120 can determine that the mobile station 110 should perform a handover from the source base station 120 to a target base station 130. The source base station 120 can receive timing advance information from the target base station 130. The source base station 120 can forward the timing advance information to the mobile station 110. The source base station 120 can then perform a handover by switching a connection of the mobile station 110 from the source base station 120 to the target base station 130.

The source base station 120 can forward data intended for the mobile station 110 to the target base station 130 in response to receiving the timing advance information from the target base station 130. The data intended for the mobile station 110 can be buffered in the source base station 120 prior to forwarding the data to the target base station 130.

The source base station 120 can receive timing advance information by receiving timing advance information and a medium access control identifier from the target base station 130. The source base station 120 can then forward the timing advance information by forwarding the timing advance information and the medium access control identifier to the mobile station 110. The source base station 120 can forward the timing advance information by sending a handover command including the timing advance information to the mobile station 110.

The source base station 120 can generate a random access channel preamble comprising a temporary mobile equipment identifier for the mobile station 110 and send the random access channel preamble to the mobile station 110. The source base station 120 can also send a persistent resource assignment message to the mobile station 110. The persistent resource assignment message can indicate resources reserved for handover communications. The source base station 120 can send the random access channel preamble to the mobile station by sending a handover preparation message over a resource reserved for handover communications to the mobile station 110. The handover preparation message can include the random access channel preamble. The source base station 120 can generate the random access channel preamble by selecting the random access channel preamble from a set of a plurality of random access channel preambles reserved for handover. The set of a plurality of preambles can be shared between a plurality of base stations in adjacent cells. A base station of the plurality of base stations can select a random access channel preamble based on a different starting random access channel preamble within the set from at least one other base station of the plurality of base stations.

According to a related embodiment, the mobile station 110 can establish a connection with the source base station 120. The mobile station 110 can transmit a measurement report to the source base station 120. The mobile station 110 can receive timing advance information from the source base station 120. The mobile station 110 can then switch a connection from the source base station 120 to a target base station 130.

The mobile station 110 can receive the timing advance information by receiving the timing advance information and the medium access control identifier. The mobile station 110 can also receive the timing advance information by receiving a handover command including the timing advance information from the source base station 120.

The mobile station 110 can also receive random access channel preamble from the source base station 120. The mobile station 110 can receive a persistent resource assignment message from the source base station 120. The persistent resource assignment message can indicate resources reserved for handover communications. The mobile station 110 can receive the random access channel preamble by receiving a handover preparation message over a resource reserved for handover communications. The handover preparation message can include the random access channel preamble. The random access channel preamble from the source base station 120 can be based on a set of a plurality of random access channel preambles reserved for handover. The set of a plurality of preambles can be shared between a plurality of base stations in adjacent cells. A base station of the plurality of base stations can select a random access channel preamble based on a different starting random access channel preamble from at least one other base station of the plurality of base stations.

Figure 2:
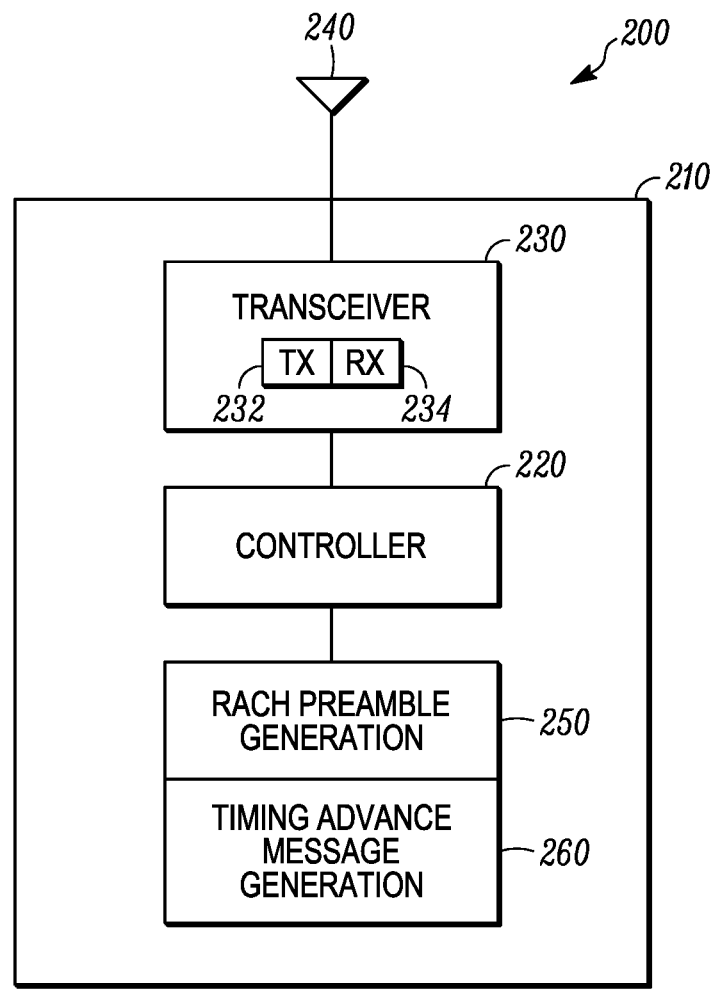
FIG. 2 is an exemplary block diagram of a base station according to one embodiment.

FIG. 2 is an exemplary block diagram of a base station 200, such as the source base station 120 or the target base station 130, according to one embodiment. The base station 200 can include a housing 210, a controller 220 coupled to the housing 210, a transceiver 230 coupled to the housing 210, an antenna 240 coupled to the transceiver 230, a random access channel preamble generation module 250, and a timing advance generation module 260. The transceiver 230 can include a transmitter 232 and a receiver 234 for transmitting and receiving signals over a wireless or a wired network. The transceiver 230 may also include multiple transceivers for communicating over wireless and/or wired networks. For example, the transceiver 230 may include a wireless transceiver for communicating with the mobile station 110 and may include a wired transceiver for communicating with other base stations. The random access channel preamble generation module 250 and the timing advance generation module 260 can be coupled to the controller 220, can reside within the controller 220, can be autonomous modules, can be software, can be hardware, or can be in any other format useful for a module in a base station 200.

According to one embodiment, the base station 200 can act as a source base station for handover of a mobile station from the source base station to a target base station. Accordingly, the transceiver 230 can establish a connection with the mobile station. The transceiver 230 can also receive a measurement report from the mobile station. The controller 220 can determine the mobile station should perform a handover from the source base station to a target base station. The random access channel preamble generation module 250 can generate a random access channel preamble in response to determining the mobile station should perform a handover. The random access channel preamble can include a temporary mobile equipment identifier for the mobile station. The transceiver 230 can send the random access channel preamble to the mobile station. The controller 220 can then switch the connection with the mobile station from the source base station to the target base station.

The transceiver 230 can also send the random access channel preamble to the target base station. After sending the random access channel preamble to the target base station, the transceiver 230 can receive, from the target base station, a timing advance message including timing advance information for the mobile station. The transceiver 230 can also send the timing advance message to the mobile station. After determining the mobile station should perform a handover, the transceiver 230 can further send a handover request to the target base station. The handover request can include the random access preamble and can request handover of the mobile station from the source base station to the target base station.

The transceiver 230 can also send a persistent resource assignment message to the mobile station. The persistent resource assignment message can indicate resources reserved for handover communications. The transceiver can additionally send the random access channel preamble to the mobile station by sending a handover preparation message over a resource reserved for handover communications to the mobile station. The handover preparation message can include the random access channel preamble.

The random access channel preamble generation module 250 can generate the random access channel preamble by selecting the random access channel preamble from a set of a plurality of random access channel preambles reserved for handover. The set of a plurality of preambles can be shared between a plurality of base stations in adjacent cells. A base station of the plurality of base stations can select a random access channel preamble based on a different starting random access channel preamble from at least one other base station of the plurality of base stations.

According to another embodiment, the base station 200 can act as a target base station for handover of a mobile station from a source base station to the target base station. Accordingly, the receiver 234 can receive a handover indication from a source base station that is connected with the mobile station. The handover indication can include random access channel preamble. The random access channel preamble can include a temporary mobile equipment identifier for the mobile station. The receiver 234 can also receive the random access channel preamble from the mobile station. The controller 220 can control the operations of the target base station. The controller 220 can process the handover indication to determine a handover is desired for the mobile station associated with the random access channel preamble. In response to receiving random access channel preamble, the timing advance message generation module 260 can generate a timing advance message and address the timing advance message based on the random access channel preamble and a source base station identifier. The transmitter 232 can send the timing advance message to the mobile station. The controller 220 can then switch the connection with the mobile station from the source base station to the target base station 200.

The timing advance message generation module 260 can calculate a timing advance for the mobile station for inclusion in the timing advance message. The timing advance message can include the timing advance for the mobile station and an uplink grant for the mobile station. The timing advance can calculated based on the propagation time of radio waves between the mobile station and the target base station.

The random access channel preamble can be based on selecting the random access channel preamble from a set of a plurality of random access channel preambles reserved for handover. The set of a plurality of preambles can be shared between a plurality of base stations in adjacent cells. A base station of the plurality of base stations can select a random access channel preamble based on a starting random access channel preamble within the set different from a starting random access channel preamble assigned to at least one other base station of the plurality of base stations.

The receiver 234 can receive the handover indication from a source base station that is connected with the mobile station. The handover indication can include a random access channel preamble associated with the mobile station. The handover indication can be received in response to the source base station receiving a measurement report from the mobile station and making a handover determination based on the measurement report.

According to another embodiment, the base station 200 can act as a source base station for handover of a mobile station from the source base station to a target base station. Accordingly, the transceiver 230 can establish a connection with the mobile station and receive a measurement report from the mobile station. The controller 220 can determine that the mobile station should perform a handover from the source base station to a target base station. The transceiver 230 can receive timing advance information at the source base station from the target base station. The transceiver 230 can then forward the timing advance information from the source base station to the mobile station. The controller 220 can then switch a connection of the mobile station from the source base station to the target base station.

The transceiver 230 can forward data intended for the mobile station to the target base station in response to receiving the timing advance information from the target base station. The data intended for the mobile station can be buffered in the source base station prior to forwarding the data to the target base station. The transceiver 230 can also receive timing advance information and a medium access control identifier from the target base station. The transceiver 230 can then forward the timing advance information and the medium access control identifier to the mobile station. The transceiver 230 can forward the timing advance information by sending a handover command including the timing advance information from the source base station to the mobile station.

The controller 220 can generate a random access channel preamble including a temporary mobile equipment identifier for the mobile station. The transceiver 230 can then send the random access channel preamble to the mobile station. The transceiver 230 can send a persistent resource assignment message to the mobile station. The persistent resource assignment message can indicate resources reserved for handover communications. The transceiver 230 can send the random access channel preamble to the mobile station by sending a handover preparation message over a resource reserved for handover communications to the mobile station. The handover preparation message can include the random access channel preamble. The controller 220 can generate the random access channel preamble at the source base station by selecting a next available random access channel preamble in set of a plurality of random access channel preambles reserved for handover. The set of a plurality of preambles can be shared between a plurality of base stations in adjacent cells. A base station of the plurality of base stations can select a random access channel preamble based on a different starting random access channel preamble within the set from a starting random access channel preamble designated for at least one other base station of the plurality of base stations.

Figure 3:
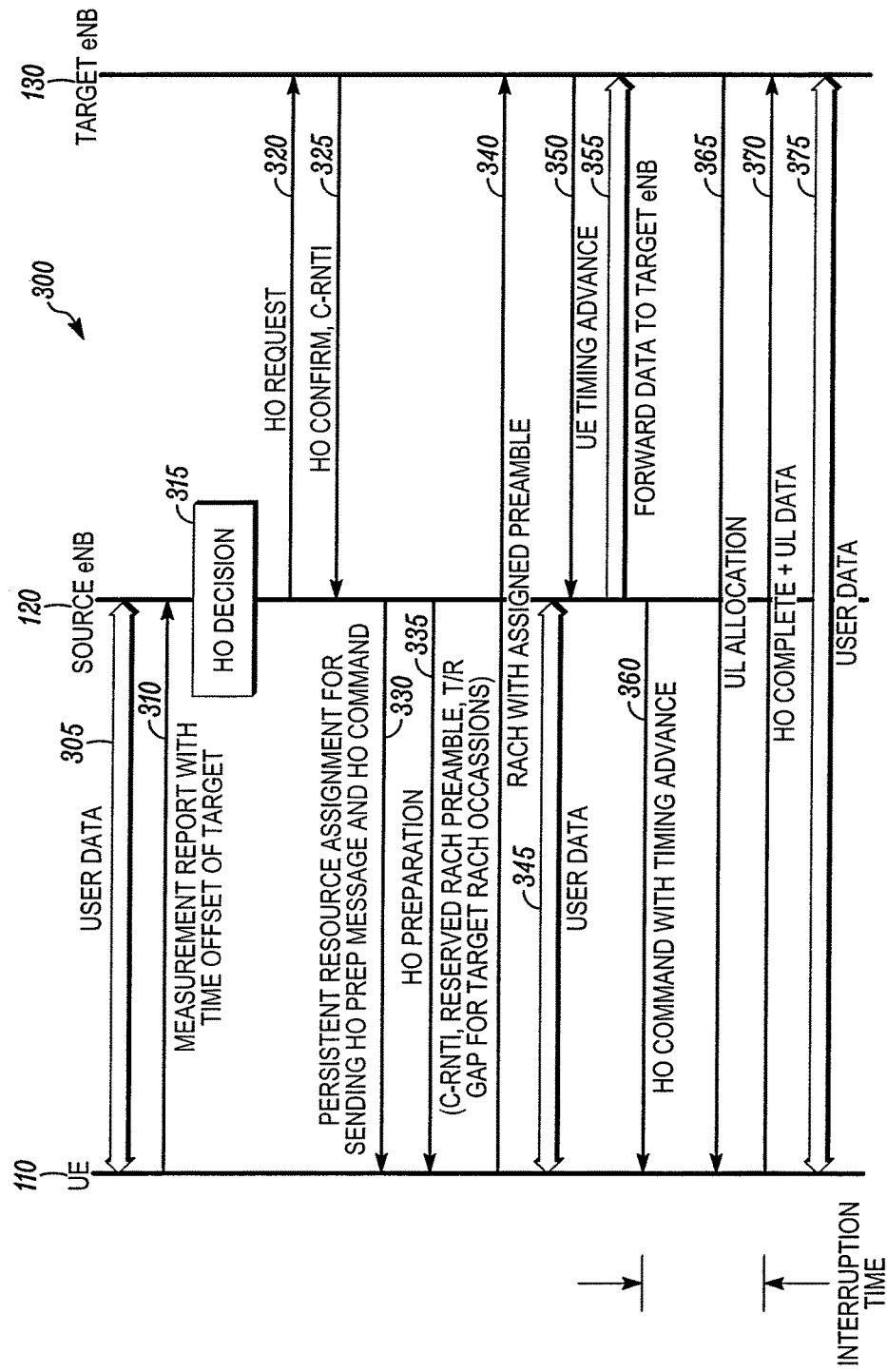
FIG. 3 is an exemplary signal diagram illustrating the operation of a wireless system according to one embodiment.

FIG. 3 is an exemplary signal diagram illustrating the operation of a wireless system according to one embodiment. In step 305, the mobile station 110, such as User Equipment (UE) 110 and the source base station 120, such as an Evolved Node-B (eNB), can establish a connection and exchange data. In step 310, the mobile station can send a measurement report to the source base station 120. In step 315, the source base station 120 can decide to perform a handover of the mobile station to the target base station 130. In step 320, the source base station 120 can communicate with target eNB to request the handover. In step 325, the target base station 130 can agree to the handover and provide a medium access control identifier (MAC ID), such as a reserved Cell Radio Network Temporary Identifier (C-RNTI) for the mobile station 110 to the source base station 120. In step 330, the source base station 120 can send a persistent resource assignment for the transmission of a handover preparation message and the handover command. This assignment can discontinue any previous persistent assignment the mobile station 110 might have had, such as for Voice over Internet Protocol (VoIP). The persistent resource assignment can be used to increase the chance of quick and successful delivery of the handover preparation message and the handover command. In step 335, the source base station 120 can use the persistent resource to send the handover preparation command to the mobile station 110. The handover preparation command can be a small message, such as about 50 bits, and can be transmitted using enough resource blocks to guarantee delivery on the first attempt, for example, without a Hybrid Automatic Request (HARQ) re-transmission. The handover preparation command can include a schedule for a transmit/receive gap corresponding to RACH occasions on the target base station 130, a reserved RACH preamble on the target base station, and the reserved MAC-ID. The reserved RACH preamble can be assigned autonomously by the source base station 120 without any co-ordination with the target base station 130. The mobile station 110 can use the transmit/receive gap to perform access for synchronization to the target base station 130 without any interruption in traffic between the mobile station 110 and the source base station 120. Thus, in step 340, the mobile station 110 can send the reserved RACH preamble and does not need to wait for a response from the target base station 130. Instead it can continues the Up Link (UL) and Down Link (DL) traffic with the source base station 120. With this scheme, the gaps can be very small, such as about 2 ms, so the source base station 120 can still schedule traffic for the mobile station 110 without significant delay, such as in step 345. Upon receipt of the reserved RACH preamble, the target base station 130 can calculate the mobile station's timing advance and send it to the source base station 120 in step 350. In step 355, the source base station 120, can forward data that has been buffered for the mobile station 110 to the target base station 130. In step 360, the source base station 120 can send a handover command including the timing advance to the mobile station 110. The handover command message can be sent using the persistent resource allocated in step 330. The handover command can be a small message, such as about 8-10 bits for timing advance, and can be delivered using enough resource blocks to guarantee delivery on the first attempt, such as without HARQ retransmission. If the mobile station 110 does not receive the handover command in a specified duration step 340 can be repeated. In step 365, the target base station 130 can send an UL allocation message on a control channel. Once the UL allocation message is received, in step 375, the mobile station 110 can send a handover complete command to the target base station to establish a connection and exchange data.

For the persistent scheduling mechanism, both the handover preparation message and the handover command can be small messages. The payload for the timing advance can be 8-10 bits and the entire message is less than 20 bits. The handover preparation message can contain the MAC ID, the reserved RACH preamble (6 bits), the transmit/receive gap schedule (approximately 10 bits). Thus, the handover preparation message is likely to be less than 40 bits. The control channel can allows 46 bits and typically even mobile stations at the edge of the cell covered by a base station can receive the control channel. Therefore, for two messages each smaller than 46 bits, it is not necessary to use a DL control channel to schedule the messages and then send the messages. Instead a persistent resource assignment can be used. Accordingly, a persistent resource assignment is provided, such as in step 330, that assigns the mobile station 110 n occurrences of two or more resource blocks per occurrence, where successive occurrences can be separated by t ms, such as about 10 ms. A minimum of two resource blocks can be used to ensure that both of the messages go through on the first attempt in cell edge conditions. The handover preparation message can be transmitted using the assigned resource blocks. The mobile station 110 can then send the RACH preamble to the target base station in step 340 and return to the source base station 120 and continue the connection while it waits for handover command in the assigned resource blocks. In step 360, when the mobile station 110 receives the handover command, it can listen to the target base station 130, get UL allocation in step 365, and send a handover complete message in step 370. Alternatively, the mobile station 110 could be sent the UL allocation via the source base station 120 along with the timing advance, which could still keep the handover command smaller than 46 bits.

Figure 4:
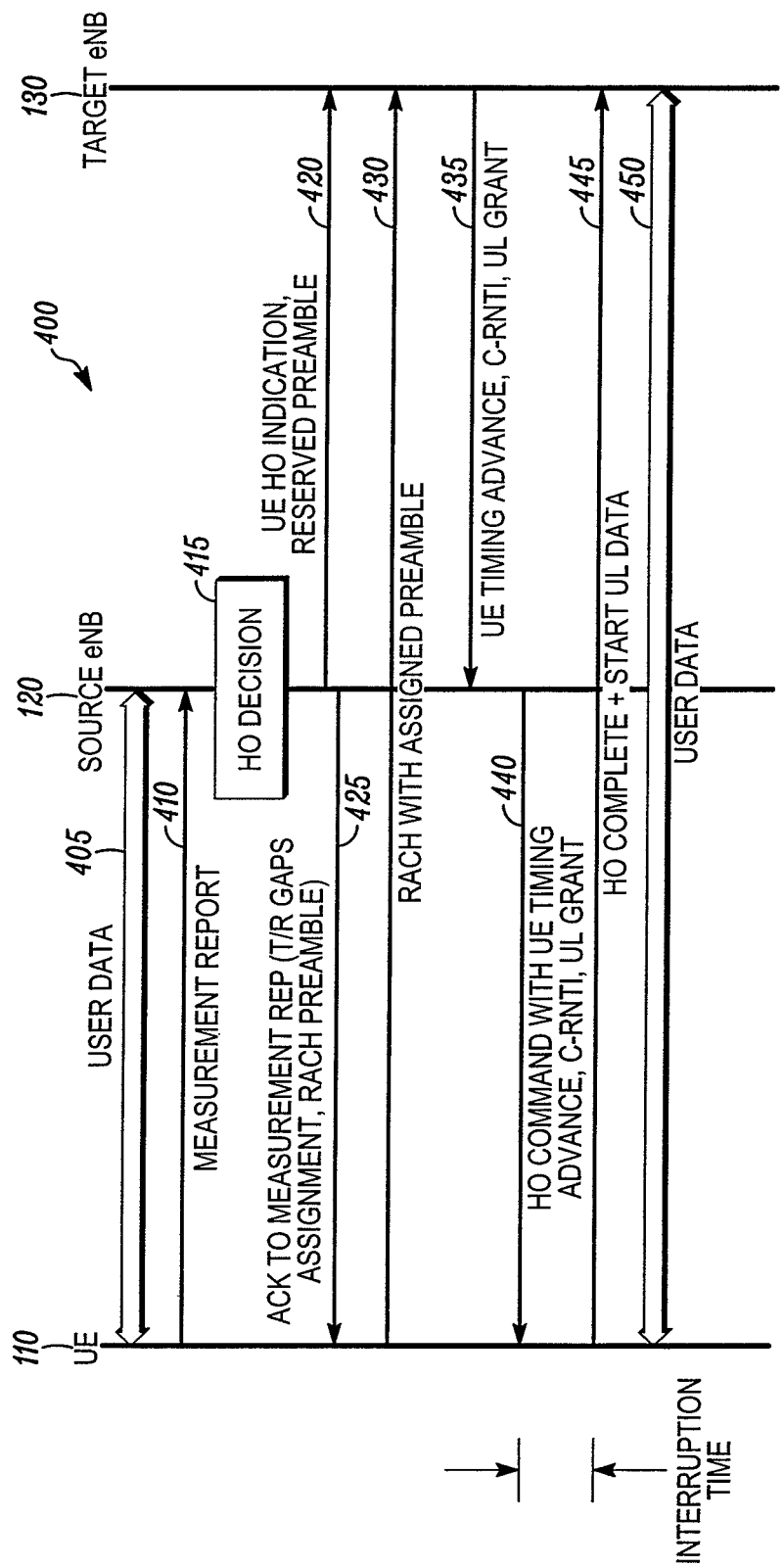
FIG. 4 is an exemplary signal diagram illustrating the operation of a wireless system according to another embodiment.

FIG. 4 is an exemplary signal diagram illustrating the operation of a wireless system according to another embodiment. In step 405, the mobile station 110 and the source base station 120 can establish a connection and exchange data. In step 410, the mobile station can send a measurement report to the source base station 120. In step 415, the source base station 120 can decide to perform a handover of the mobile station to the target base station 130. In step 425, the source base station 120 can acknowledge the measurement report in a message that can include a transmit/receive gap assignment and a RACH preamble. The T/R gap can allow the mobile station 110 to switch to the target base station 130, send the RACH preamble, and return to the source base station 120. The mobile station 110 may not be scheduled by the source base station 120 during the gap. The RACH preamble can be assigned by the source base station 120 without any interaction with the target base station. In step 420, the source base station 120 can send a message to the target base station 130 indicating that a handover is starting. The message can include the mobile station identity and the reserved RACH preamble. In step 430, the mobile station 110 can send the reserved RACH preamble to the target base station 130. The mobile station does not have to wait for a response from the target base station 130. Instead it can continue the UL and DL traffic with source base station 120. With this scheme, the gaps can be very small, such as about 2 ms, so the source base station 120 can still schedule traffic for the mobile station 110 without significant delay. Upon receipt of the reserved RACH preamble, the target base station 130 can calculate the mobile station's timing advance. The target base station can then construct and send to the source base station 120, in step 435, a handover command that includes the timing advance, a MAC ID, and an UL grant. In step 440, the source base station 120 can forward the handover command to the mobile station 110. In step 445, the mobile station 110 can send a handover complete message to the target base station 130 and start UL data transfer to establish a connection. In step 450, the mobile station 110 can exchange data with the target base station 130.

Figure 5:
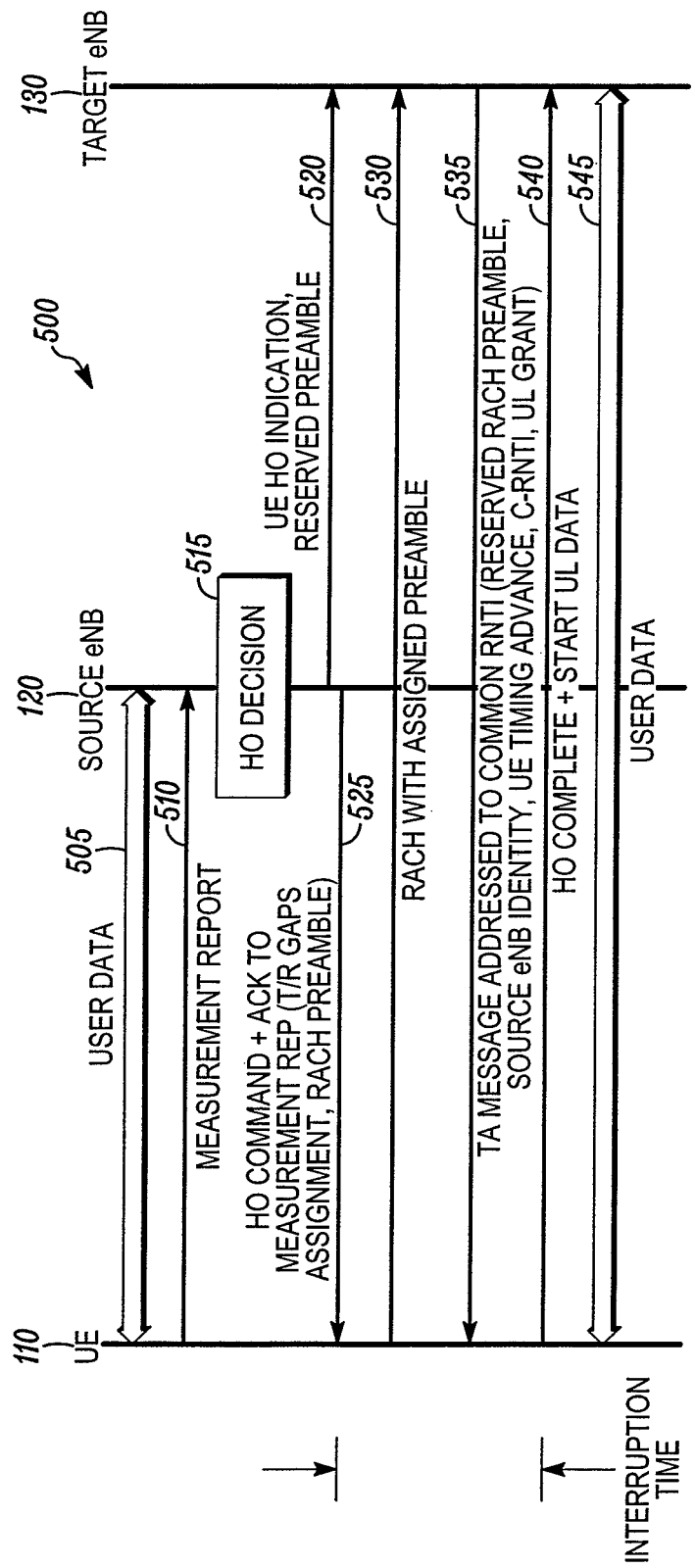
FIG. 5 is an exemplary signal diagram illustrating the operation of a wireless system according to another embodiment.

FIG. 5 is an exemplary signal diagram illustrating the operation of a wireless system according to another embodiment. In step 505, the mobile station 110 and the source base station 120 can establish a connection and exchange data. In step 510, the mobile station can send a measurement report to the source base station 120. In step 515, the source base station 120 can decide to perform a handover of the mobile station to the target base station 130. In step 525, the source base station 120 can send a handover command, acknowledging the measurement report in a message that can include a transmit/receive gap assignment and a RACH preamble. In step 520, the source base station 120 can send a message to the target base station 130 indicating that a handover is starting and wait for a response directly from the target base station 130. The message can include the reserved RACH preamble. In step 530, the mobile station 110 can send the reserved RACH preamble to the target base station 130.

The target base station 130 can then calculate the mobile station's timing advance and in step 535 send a timing-advance message addressed to a predefined MAC ID, such as a C-RNTI, globally reserved for the Timing advance message. The timing advance message can convey the mobile station's timing advance, the source base station identity of the mobile station 110 for which the timing advance message is intended, the RACH preamble assigned to the mobile station by the source base station 130, and the UL grant. A mobile station that is expecting a timing advance message can monitor the shared channel for a timing advance message that matches its source base station identity and the RACH preamble that was assigned to it. In step 540, the mobile station 110 can then use the UL resources granted to send the handover complete message to establish a connection. In step 545, the mobile station 110 can exchange data with the target base station 130.

Figure 6:
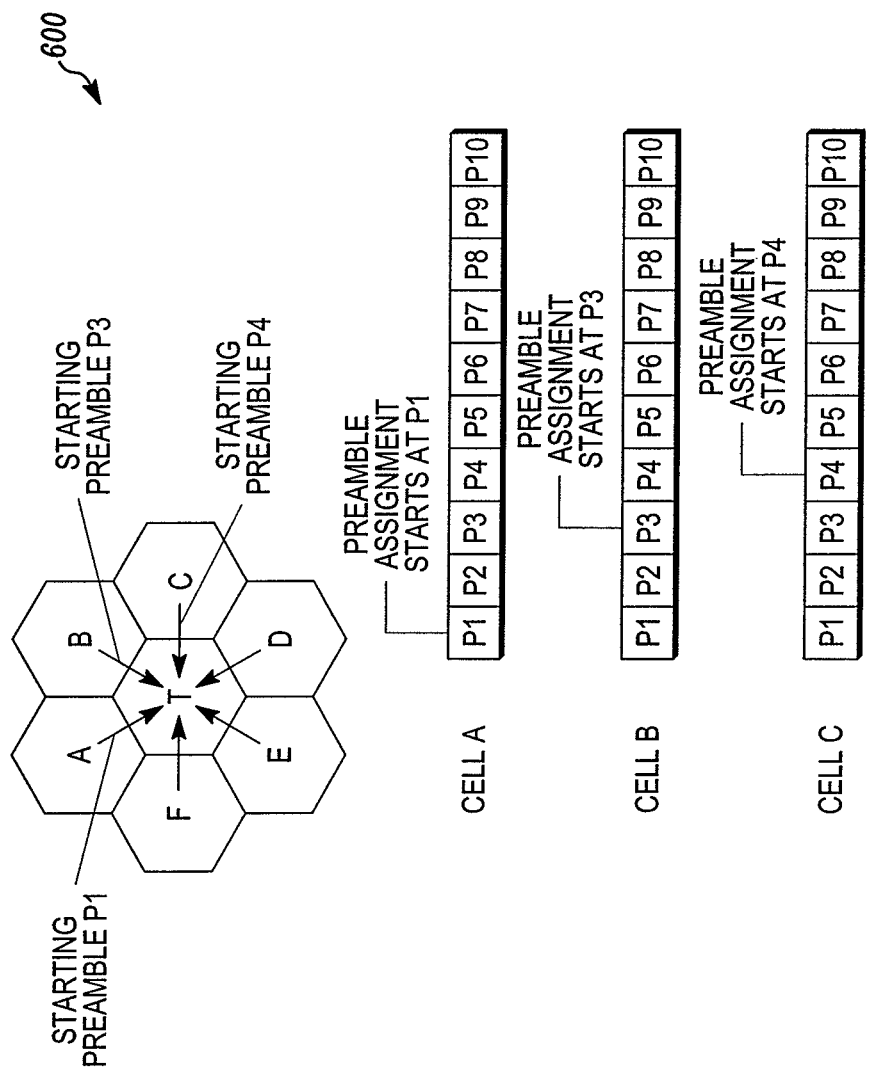
FIG. 6 is an exemplary illustration of preamble assignment in a wireless system according to one embodiment.

FIG. 6 is an exemplary illustration of preamble assignment in a wireless system according to one embodiment. The preamble assignment can be used for source base stations in cells A, B, C, D, E, and F, when assigning a RACH preamble for handover to a target base station in cell T. The preamble assignment process can be used by a source base station to assign a reserved contention-free RACH preamble to a mobile station. A contention-free RACH preamble can prevent RACH collisions between mobile stations attempting handover or other procedures. A contention-free RACH preamble can also prevent RACH collisions between two mobile stations attempting handover to the same cell at the same time. To further prevent collisions, it can be useful to have a conservative duration for which the RACH preamble is reserved. Even so, the probability of two mobile stations attempting handover to the same cell at the same time using the same RACH preamble can be low.

To achieve a good method for RACH preamble assignment by a source base station, a pool of RACH preambles (P1, . . . , Pn) can be reserved globally in a system for handover and no real time management/assignment of RACH preambles needs to be done at the target base station. All handovers can use RACH preambles from this pool. The source base station can assign RACH preambles from the pool without the RACH preambles being reserved at the target base station T. Let S1, . . . , Sk be the source base stations from which mobile stations (such as User Equipment, UE's) can handover to target base station T. For each source base station, a starting preamble Pi can be statically configured. The RACH preamble assigned by the source base station can be valid at the next RACH opportunity. For each RACH opportunity the source base station starts assigning RACH preambles at Pi. Suppose UE1, . . . UEt are awaiting RACH preambles for handover. The source base station can assign P1 to UE1, P2 to UE2 and so on. This can help eliminate collision between UE's attempting to handover from the same source to the same target at the same RACH opportunity.

To avoid collision between UE's in different source base stations attempting handover to the same target base station, consider source base station Si and Sj with starting preambles Pi and Pj respectively. A UE in Si and an UE in Sj can get assigned the same RACH preamble only if there are j−i+1 UE's that are assigned a RACH preamble in Si for the same RACH opportunity. The probability of t UE's requiring a RACH preamble at the same RACH opportunity, where RACH opportunities are about every 10 ms, is typically low for t≥2 and decreases rapidly with increasing t. If there is a burst of many UE's all attempting to handover at the same RACH opportunity, the source base station can choose to delay the assignment of the RACH preamble so that the RACH is delayed to the next RACH opportunity. The gap between the starting preambles i.e., (j−i) can also be set differently for different cells and could be based on for example traffic.

When there are multiple candidate target base stations, according to one embodiment, a UE's measurement report may identify more than one candidate target base station. Some implementations might send the handover request to all the candidate target base station and, based on the response, pick one target base station. According to other embodiments, in the acknowledgement to the measurement report, the UE can be assigned multiple RACH preambles, one for each candidate target base station. The UE can then try the RACH preambles in succession. For example, if the RACH to the first target base station is unsuccessful, the UE can try the next, and so on.

Additionally, according to some embodiments, if a UE does not get the handover command after waiting for a defined timer expiration after transmitting the RACH preamble, the UE can send a RACH preamble to the target base station and listen to the target base station for UL resource grant. The UE can increment its preamble index after a failed RACH attempt by a pre-defined increment. For example, if there is no response to RACH when the preamble used is Pi, the second RACH attempt can use Pi+1.

Thus, the present disclosure can use transmit/receive gaps to send the RACH preamble and not await a response directly from the target base station. This can allow the UE to return to its data exchange with the source base station. Also the present disclosure can assign a RACH preamble by the source base station, which can eliminate the need to co-ordinate with the target, make the preamble management less complex, and reduce the overall handover duration. The UE does not have to wait for a response from the target base station after sending the RACH preamble. The UE's timing advance can be sent to it via the source base station, which can allow the UE to return to the source base station and continue without interruption. Also, a separate HO preparation command can be followed later by a HO command and a short persistent resource assignment for delivering handover signaling messages. Such persistent resource assignment can allow delivery of user data and can share resources among a group of UE's. The persistent resource can be used to improve reliability of message delivery as the UE's link with the source base station is deteriorating. Additionally, a RACH preamble can be assigned by a source base station that is valid at the target base station with no requirement of reservation of the resource at the target base station. Furthermore, a RACH preamble can be assigned from a global pool of preambles, such that successive assignments for the same RACH opportunity are successive preambles to prevent collision between UE's attempting handover from same source base station. Also, starting preambles can be designated for each source base station from a global pool of RACH preambles to prevent collision between UE's attempting handover from different source base stations. Additionally, the combination of the assigned RACH preamble and the source base station identity can be used to identify the UE in the target base station. Furthermore, un-transmitted data can be forwarded from the source base station to the target base station upon receiving of the UE timing advance by the source base station.

The present disclosure can minimize interruption time by forwarding the timing advance through the source base station. The present disclosure can also minimize interruption time and also reduce the overall handover duration by forwarding the timing advance through the source base station and eliminating the source base station and target base station co-ordination prior to UE sending RACH preamble. The present disclosure can also reduce the overall handover duration by eliminating the source base station and target base station co-ordination prior to UE sending the RACH preamble. The present disclosure can further help eliminate the real-time assignment/management of RACH preambles at the target base station.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method in a source base station that is connected with a mobile station for handover of the mobile station, the method comprising:
   sending a handover request to a target base station, the handover request including a random access channel preamble generated at the source base station, the random access channel preamble comprising a temporary mobile equipment identifier;
   receiving, from the target base station, a timing advance message including timing advance information for the mobile station;
   forwarding the timing advance message to the mobile station prior to performing the handover by switching a connection of the mobile station from the source base station to the target base station.

2. The method of claim 1, further comprising:
   receiving, from the target base station, a medium access control identifier; and
   forwarding the medium access control identifier to the mobile station.

3. The method of claim 1, further comprising:
   sending a persistent resource assignment message to the mobile station, the persistent resource assignment message indicating resources reserved for handover communications.

4. The method of claim 3, further comprising:
   sending the random access channel preamble to the mobile station by sending a handover preparation message over at least one of the resources reserved for handover communications to the mobile station.

5. The method of claim 1, wherein the random access channel preamble is selected from a set of a plurality of random access channel preambles reserved for the handover.

6. The method of claim 5, wherein the set of the plurality of random access channel preambles are shared between a plurality of base stations in adjacent cells and wherein a base station of the plurality of base stations selects the random access channel preamble from the plurality of random access channel preambles based on a starting random access channel preamble that is different than a starting random access channel preamble for at least one other base station of the plurality of base stations.

7. The method of claim 1, wherein the handover request is sent to the target base station in response to the source base station receiving a measurement report from the mobile station and making a handover determination based on the measurement report.

8. A source base station comprising:
   a controller;
   a transceiver, coupled to the controller, configured to:
   send a handover request to a target base station, the handover request including a random access channel preamble generated at the source base station, the random access channel preamble comprising a temporary mobile equipment identifier;
   receive, from the target base station, a timing advance message including timing advance information for the mobile station; and
   forward the timing advance message to the mobile station prior to the controller performing the handover by switching a connection of the mobile station from the source base station to the target base station.

9. The source base station of claim 8, wherein the transceiver is further configured to:
   receive, from the target base station, a medium access control identifier; and
   forward the medium access control identifier to the mobile station.

10. The source base station of claim 8, wherein the transceiver is further configured to:
    send a persistent resource assignment message to the mobile station, the persistent resource assignment message indicating resources reserved for handover communications.

11. The source base station of claim 10, wherein the transceiver is further configured to:
    send the random access channel preamble to the mobile station by sending a handover preparation message over at least one of the resources reserved for handover communications to the mobile station.

12. The source base station of claim 8, further comprising:
    a random access channel preamble generation module, coupled to the controller, configured to generate the random access channel preamble by selecting the random access channel preamble from a set of a plurality of random access channel preambles reserved for the handover.

13. The source base station of claim 12, wherein the set of the plurality of random access channel preambles are shared between a plurality of base stations in adjacent cells and wherein a base station of the plurality of base stations selects the random access channel preamble from the plurality of random access channel preambles based on a starting random access channel preamble that is different than a starting random access channel preamble for at least one other base station of the plurality of base stations.

14. The source base station of claim 8, wherein the transceiver sends the handover request to the target base station in response to the source base station receiving a measurement report from the mobile station and making a handover determination based on the measurement report.

* * * * *